(12) United States Patent
Mullins

(10) Patent No.: US 11,575,400 B2
(45) Date of Patent: Feb. 7, 2023

(54) PIM CANCELLATION

(71) Applicant: Nokia Solutions and Networks Oy, Espoo (FI)

(72) Inventor: Aaron Mullins, Hurst, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/388,070

(22) Filed: Jul. 29, 2021

(65) Prior Publication Data

US 2022/0038125 A1 Feb. 3, 2022

(30) Foreign Application Priority Data

Aug. 3, 2020 (FI) ...................................... 20205778

(51) Int. Cl.
*H04B 1/10* (2006.01)
*H04B 1/525* (2015.01)
*H04B 1/12* (2006.01)

(52) U.S. Cl.
CPC .......... *H04B 1/109* (2013.01); *H04B 1/1081* (2013.01); *H04B 1/123* (2013.01); *H04B 1/525* (2013.01)

(58) Field of Classification Search
CPC . H04B 1/06; H04B 1/10; H04B 1/109; H04B 1/1081; H04B 1/12; H04B 1/123; H04B 1/16; H04B 1/38; H04B 1/40; H04B 1/525; H04B 2001/485
See application file for complete search history.

(56) References Cited

U.S. PATENT DOCUMENTS

| | | | |
|---|---|---|---|
| 9,768,812 B1* | 9/2017 | Tsui | H04B 17/0085 |
| 10,141,961 B1* | 11/2018 | Huang | H04B 1/0475 |
| 10,727,896 B2* | 7/2020 | Lv | H04B 1/0475 |
| 2015/0244414 A1 | 8/2015 | Yu et al. | |
| 2016/0099733 A1 | 4/2016 | Weissman et al. | |

(Continued)

FOREIGN PATENT DOCUMENTS

| | | |
|---|---|---|
| EP | 2884668 A1 | 6/2015 |
| EP | 3531565 A1 | 8/2019 |

(Continued)

OTHER PUBLICATIONS

Search Report received for corresponding United Kingdom Application No. 2111030.9, dated Jan. 26, 2022, 8 pages.

(Continued)

*Primary Examiner* — Quochien B Vuong
(74) *Attorney, Agent, or Firm* — Tong, Rea, Bentley & Kim, LLC

(57) ABSTRACT

An apparatus, method and computer program product is disclosed. The apparatus may comprise means for transmitting and receiving radio frequency signals using a radio system coupled to an external antenna via an additional combiner or diplexer, means for receiving one or more reference signals usable for measurement of passive intermodulation from one or more nodes provided in a signal path external to the radio system, a first one of said nodes being associated with a signal path between the additional combiner or diplexer and the external antenna, and means for performing passive intermodulation cancellation based on the received one or more reference signals, including a first reference signal from the first node.

16 Claims, 9 Drawing Sheets

(56) References Cited

U.S. PATENT DOCUMENTS

| | | |
|---|---|---|
| 2016/0366605 A1 | 12/2016 | Tsui et al. |
| 2017/0063427 A1 | 3/2017 | Lee et al. |
| 2017/0141807 A1* | 5/2017 | Chen ..................... H04B 1/123 |
| 2018/0248576 A1 | 8/2018 | Coe et al. |
| 2019/0253098 A1 | 8/2019 | Lv et al. |

FOREIGN PATENT DOCUMENTS

| | | | |
|---|---|---|---|
| KR | 20180110345 A | 10/2018 | |
| KR | 1020180110345 A * | 10/2018 | ............ H04B 15/02 |
| WO | 2016/110727 A1 | 7/2016 | |
| WO | 2018/055435 A1 | 3/2018 | |
| WO | 2020/113928 A1 | 6/2020 | |

OTHER PUBLICATIONS

Waheed et al., "Digital Cancellation of Passive Intermodulation in FDD Transceivers", arXiv, Dec. 10, 2018, 7 pages.

Office action received for corresponding Finnish Patent Application No. 20205778, dated Nov. 13, 2020, 7 pages.

Office action received for corresponding Finnish Patent Application No. 20205778, dated May 11, 2021, 4 pages.

\* cited by examiner

PIM CANCELLATION

FIELD

This specification relates to an apparatus, method and computer program product relating to passive intermodulation (PIM) cancellation.

BACKGROUND

Passive Intermodulation (PIM) is a well-known telecommunications issue. It is caused if multiple signals are transmitted through a non-linear system. A non-linear system may be a system comprising active components, but it may also occur in passive components, e.g. due to aging antennas, corroded or loose connectors, cables, connectors, combiners and filters, e.g. passive duplex filters. Due to PIM, intermodulation products (IMPs) may occur at frequencies f corresponding to $k_a f_a + k_b f_b + k_c f_c + \ldots$, wherein $f_a$, $f_b$, $f_c$, ... are the frequencies of the plural signals, and $k_a$, $k_b$, $k_c$, ... are integer coefficients (positive, negative, or 0). The sum $k_a + k_b + k_c + \ldots$ is denoted as the order of the IMP, denoted as IMP3, IMP5, IMP7 etc. for IMP of $3^{rd}$, $5^{th}$, and $7^{th}$ order, respectively. The amplitude of the IMPs may decrease with increasing order of the IMPs. IMP3 is typically most relevant because it is located close to the input signal and has relatively high amplitude.

To mitigate the effects of PIM, PIM cancellation (PIMC) techniques can be employed which may involve deriving an estimate of the PIM which is then cancelled from the received signal. This may involve estimating a PIM signal or model and using said PIM signal or model to subtract or filter out the PIM from the received signal to leave substantially the required signal.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, the specification discloses an apparatus, comprising: means for transmitting and receiving radio frequency signals using a radio system coupled to an external antenna via an additional combiner or diplexer; means for receiving one or more reference signals usable for measurement of one or more sources of passive intermodulation from one or more nodes provided in a signal path external to the radio system, a first one of said nodes being associated with a signal path between the additional combiner or diplexer and the external antenna; and means for performing passive intermodulation cancellation based on the received one or more reference signals, including a first reference signal from the first node.

The additional combiner or diplexer may be coupled to one or more further radio systems for coupling said one or more further radio systems to the external antenna.

The received one or more reference signals may be received via a first summing node which sums the first reference signal from the first node with one or more other reference signals from one or more further radio systems.

The one or more other reference signals may be received by the first summing node direct from the one or more further radio systems.

The first node may be a dual direction coupler having forward and reverse ports.

The forward and reverse ports may be coupled to a second summing node, the output of which provides the received first reference signal for performance of passive intermodulation cancellation.

The receiving means may be further configured to receive a second reference signal from a second node associated with a signal path between the radio system and the additional combiner or diplexer, and wherein performance of passive intermodulation cancellation may be based on one or both on the first reference signal and the second reference signal.

The apparatus may further comprise means for controlling selective receipt of one or both of the first reference signal and the second reference signal for use in passive intermodulation cancellation.

The second node may be associated with a signal path between an internal transmit/receive duplexer of the radio system and the additional combiner or diplexer.

The apparatus may further comprise a cancellation system configured to perform passive intermodulation cancellation based on the received one or more reference signals, the apparatus further comprising dedicated first and second signal paths or channels between respective first and second ports of the radio system and the passive intermodulation cancellation engine for receiving the first and second reference signals.

The radio system may comprises N ports for coupling to Nexternal antennas and N corresponding channels between the ports and the cancellation engine, and wherein the dedicated first and second signal paths or channels may be configured to employ a subset of the N channels not coupled via their corresponding port to an external antenna.

The apparatus may comprise a plurality of radio systems.

The apparatus may comprise a remote radio head (RRH).

According to a second aspect, the specification discloses an apparatus, comprising means for providing a radio system for transmitting and receiving radio frequency signals; means for providing an additional combiner or diplexer external to the radio system means; means for providing an antenna external to the radio system, coupled to the radio system via the additional combiner or diplexer; means for providing a coupling node between the external combiner or diplexer means and the external antenna means; and means for performing passive intermodulation cancellation based on one or more received reference signals, including a first reference signal from the coupling node means.

According to a third aspect, the specification discloses a method, comprising: transmitting and receiving radio frequency signals using a radio system coupled to an external antenna via an additional combiner or diplexer; receiving one or more reference signals usable for measurement of one or more sources of passive intermodulation from one or more nodes provided in a signal path external to the radio system, a first one of said nodes being associated with a signal path between the additional combiner or diplexer and the external antenna; and performing passive intermodulation cancellation based on the received one or more reference signals, including a first reference signal from the first node.

In the method, the additional combiner or diplexer may be coupled to one or more further radio systems for coupling said one or more further radio systems to the external antenna. The received one or more reference signals may be received via a first summing node which sums the first reference signal from the first node with one or more other reference signals from one or more further radio systems. The one or more other reference signals may be received by the first summing node direct from the one or more further radio systems. The first node may be a dual direction coupler having forward and reverse ports. The forward and reverse ports may be coupled to a second summing node, the output of which provides the received first reference signal for performance of passive intermodulation cancellation.

The method may further comprise receiving a second reference signal from a second node associated with a signal path between the radio system and the additional combiner or diplexer, and wherein performance of passive intermodulation cancellation may be based on one or both on the first reference signal and the second reference signal.

The method may further comprise controlling selective receipt of one or both of the first reference signal and the second reference signal for use in passive intermodulation cancellation.

In the method, the second node may be associated with a signal path between an internal transmit/receive duplexer of the radio system and the additional combiner or diplexer.

The method may further comprise performing passive intermodulation cancellation based on the received one or more reference signals, the method further using dedicated first and second signal paths or channels between respective first and second ports of the radio system and the passive intermodulation cancellation engine for receiving the first and second reference signals.

In the method, the radio system may comprise N ports for coupling to N external antennas and N corresponding channels between the ports and the cancellation engine, and wherein the dedicated first and second signal paths or channels may employ a subset of the N channels not coupled via their corresponding port to an external antenna.

According to a fourth aspect, this specification discloses computer-readable instructions, which, when executed by a computing apparatus, causes the computer apparatus to perform any method as described with reference to the third aspect.

According to a fifth aspect, this specification discloses a computer-readable medium (such as a non-transitory computer-readable medium) comprising program instructions stored thereon for performing the method of: transmitting and receiving radio frequency signals using a radio system coupled to an external antenna via an additional combiner or diplexer; receiving one or more reference signals usable for measurement of passive intermodulation from one or more nodes provided in a signal path external to the radio system, a first one of said nodes being associated with a signal path between the additional combiner or diplexer and the external antenna; and performing passive intermodulation cancellation based on the received one or more reference signals, including a first reference signal from the first node.

According to a sixth aspect, this specification discloses an apparatus comprising: at least one processor; and at least one memory including computer program code which, when executed by the at least one processor, causes the apparatus to: transmit and receive radio frequency signals using a radio system coupled to an external antenna via an additional combiner or diplexer; receive one or more reference signals usable for measurement of passive intermodulation from one or more nodes provided in a signal path external to the radio system, a first one of said nodes being associated with a signal path between the additional combiner or diplexer and the external antenna; and perform passive intermodulation cancellation based on the received one or more reference signals, including a first reference signal from the first node.

DRAWINGS

Embodiments will now be described in detail with reference to the accompanying drawings, in which.

DETAILED DESCRIPTION

Figure 1:
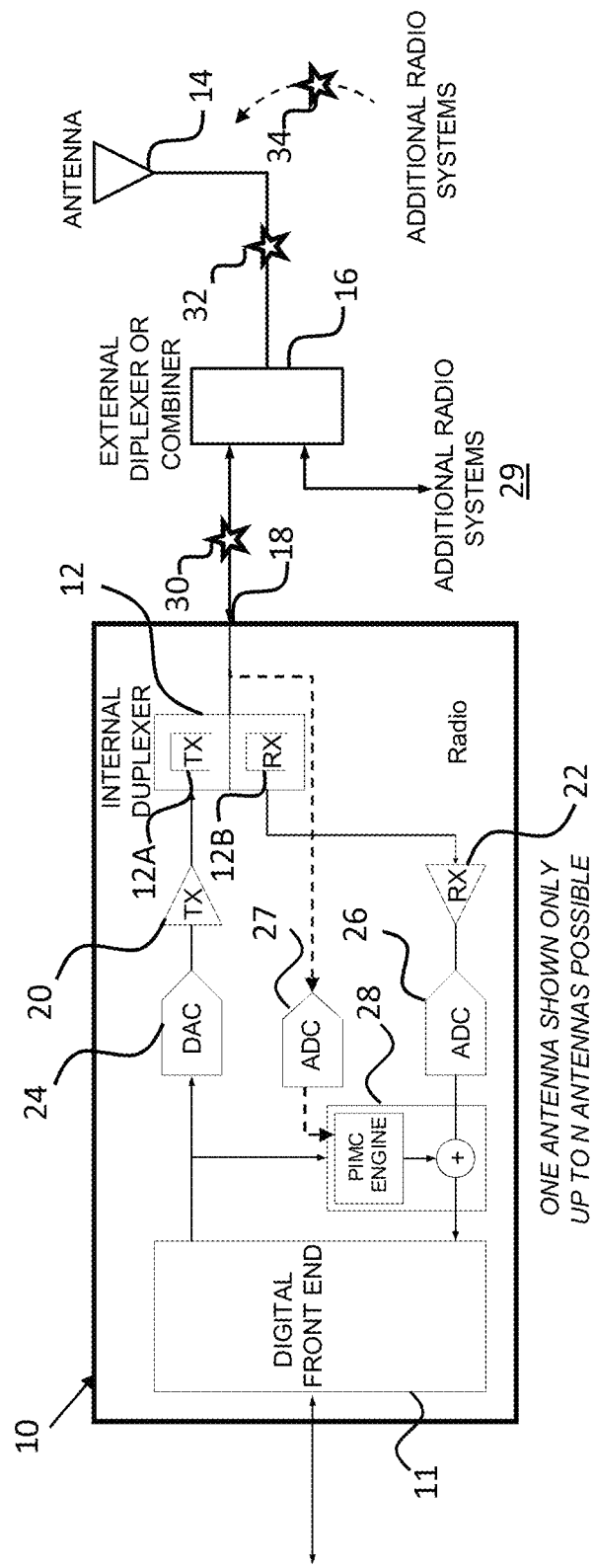
FIG. 1 is a schematic diagram of an example radio system that involves PIM cancellation, which may be useful for understanding some example embodiments.

Certain example embodiments are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting to the disclosed details.

Moreover, it is to be understood that the apparatus is configured to perform the corresponding method, although in some cases only the apparatus or only the method are described. The operations of the method may be embodied in a computer program product on, for example, a non-transitory medium such as a memory stick, portable hard drive, CD-ROM or similar.

Example embodiments relate to Passive Intermodulation (PIM) and PIM cancellation (PIMC). To give some context, cellular base stations may de-sense their own uplink owing to PIM products, for example introduced by passive components such as duplexers, cables, connector interfaces, antennas etc. If PIM is not mitigated, e.g. reduced or cancelled, it may not be possible to decode received signals. Operators may employ a PIM engine (being a generic term for one or more processors or controllers) configured to perform one or more PIM cancellation algorithms to improve uplink signal quality.

PIM is a largely natural process where transmit signals generate intermodulation products in, for example, passive devices. Intermodulation products (IMPs) may be generated at very low power levels, for example due to the aging of antennas, corroded or loose connectors and duplex filters that are passive. Imperfections of cables, combiners and attenuators may also generate PIM. PIM generation with transmit signals is generally harmless due to its low level. However, when PIM products line up with receive signals, issues can arise. Although the level of PIM in a typical radio can range from −110 dBc to −150 dBc, and sometimes as bad as −80 dBc (with respect to the transmit signal) it can cause the receiver to desensitize. As an example, a transmit signal that is 49 dBm of power may cause PIM levels that are −81 dBm to −101 dBm. Hence, on some occasions, PIM signals can be higher than the receive signals. When PIM is higher than the receive signal, the receiver decoding process will fail due to negative signal to noise ratio (SNR). This may cause a significant throughput loss in the uplink direction (mobile to base station).

Also, in cellular systems, for example, the more transmit carriers or bands that are supported at a given cellular site, and/or the more complex the antenna feed network, the more likely there will be IMPs that interfere with the desired receive frequencies.

Some radios and/or associated equipment may be designed to mitigate, i.e. reduce or avoid, such PIM effects with PIM cancellation (PIMC) algorithms. In this respect, the term PIM cancellation may also mean mitigate. A PIM cancellation algorithm may involve measuring the one or more transmit signals which create IMPs and then modelling or recreating those IMPs which can be subtracted or filtered from the received signal, comprising said interference due to PIM and the desired signal estimates, to provide substantially the desired signal.

PIMC may be performed by one or more processing components which may be internal or external to the radio system hardware. The one or more processing components may be referred to herein as a PIM cancellation engine. The one or more processing components may comprise one or more processors or controllers, one or more memory devices and software code which, when executed using the one or more processors or controllers, perform the relevant PIM cancellation algorithm.

Numerous PIMC algorithms may be known and the specific details of these are not the subject of this disclosure, other than to say that the process generally involves measurement of one or more signals which create or contribute PIM products, modelling or recreating the PIM products based on said measurement(s) and, based on said measurement, removing the PIM products from the received signal comprising the interference due to the PIM products.

Example embodiments are described with regard to a cellular radio system. However, example embodiments may be applied to any radio system for any application where PIM is an unwanted effect that it is desirable to mitigate. Cellular radio systems described herein may comprise a part of a cellular base station (e.g. eNB or gNB) or remote radio head (RRH). The cellular radio system may be configured for any existing or future cellular communications system, (e.g. 2G/3G/LTE/4G/5G).

As will be known, cellular radio systems may comprise one or more duplexers. A duplexer may be considered a three-port filtering device which allows transmitters (Tx) and receivers (Rx) operating at different frequencies to share the same antenna. A duplexer typically comprises two band pass filters in parallel, one providing the path between the transmitter (Tx) and the antenna, and the other providing the path between the antenna and the receiver (Rx). No path between the transmitter and receiver should exist. Duplexers can, however, introduce PIM. For example, the group delay characteristics of a receiver (Rx) duplexer filter (RDF) may cause a non-linear spreading effect on PIM signals such that PIM signals may exist close to or outside of the band edge of the RDF. PIM due to internal duplexers of the radio system may be referred to as "internal PIM". However, there are also PIM products generated external to radio systems, as will be explained below. Example embodiments provide apparatuses, methods and computer program products for performance of PIMC which may also take into account such external sources of PIM.

FIG. 1 is a schematic diagram of an example radio system 10 that involves PIMC, which may be useful for understanding some example embodiments. The radio system 10 comprises a digital front end 11 for handling, in the digital domain, digital signal processing appropriate for, inter alia, transmitting and receiving RF signals. The radio system 10 also comprises an internal duplexer 12 connected to an external antenna 14, in this case via an external diplexer or combiner 16 which enables one or more additional radio systems 29 (not shown) to transmit and/or receive signals using the external antenna 14. A diplexer is a passive device that implements frequency domain multiplexing, e.g. multiplexing two ports onto one port. The term diplexer is also intended to cover other multi-port variants such as triplexer (three ports to one) and quadplexer (four ports to one).

The external diplexer or combiner 16 is external in that it is connected beyond, i.e. downstream of, an antenna port 18 of the radio system 10, and can therefore be added or accessed without the need to physically access the radio system 10. The one or more additional radio systems 29 may, for example, be any type of radio system that may utilise the external antenna 14 and may or may not comprise one or more radio systems provided on the same physical infrastructure of the shown radio system 10. The internal duplexer 12 may comprise first and second duplexer filters 12A, 12B, a first being a transmitter (Tx) duplexer filter having a passband providing a signal path between a transmitter (Tx) 20 and the external antenna 14, and the second being a receiver (Rx) duplexer filter providing a signal path between the antenna and a receiver (Rx) 22. No path between the transmitter 20 and the receiver 20 should exist. The signal path between the digital front end 11 and the transmitter may comprise a digital to analogue converter (DAC) 24 and the signal path between the receiver 22 and the digital front end may comprise an analogue to digital converter (ADC) 26.

A PIM cancellation (PIMC) engine 28 may be provided internally or externally of the radio system 10. In the shown example, the PIMC engine 28 is internal, and provided between the input and output paths of the transmitter 20 and receiver 22 respectively. The PIMC engine 28 may be implemented in hardware, software or a combination thereof. The PIMC engine 28 may operate using an algorithm which is the, same or similar to, known PIM cancellation algorithms. For example, an estimate of PIM components can be measured to create or reproduce a PIM signal which may take into account multiple sources of PIM, both internal and external to the radio system 10, as will be explained below. In some embodiments, user or system selection of one, or a subset of, multiple PIM sources to measure for PIM cancellation at a given time may be enabled. For example, a user or the system may determine to measure only internal PIM sources at a given time, only external PIM sources at a different given time and all PIM sources at a different given time. The net effect of the algorithm employed by the PIMC engine 28 is to provide improved or optimal PIM cancellation at the received signal, for example by means of subtraction of the PIM signal from the overall received signal using any appropriate technique known in the art.

Measurement of PIM components may be performed in the analogue or digital domain. In the analogue domain, a sampling or measurement node or point may be located between the internal duplexer 12 and the external diplexer or combiner 16, the node providing a feed (dashed line) via an analogue to digital converter (ADC) 27 to the PIMC engine 28. In the digital domain, the received signal after the receiver analogue to digital converter (ADC) 26 is analyzed at the PIMC engine 28.

As mentioned, in practice, there may be a plurality of different PIM sources. A first source of PIM, indicated by reference numeral 30, may occur in the signal path (conductive coupling) between the radio system to and the external combiner or diplexer 16. The first PIM source 30 may be conducted to the receiver 22. Although shown external to the radio system 30, the first PIM source may be considered internal as it may be transferred to the receiver (Rx) duplexer filter 12B within the radio system to. The FIG. 1 arrangement is suitable for measuring such first source PIM components and performing PIM cancellation using the PIMC engine 28. A second source of PIM, indicated by reference numeral 32, may occur in the signal path (conductive coupling) between the external combiner or diplexer 16 and the external antenna 14. Similarly, the second PIM source 32 may be conducted to the receiver 20. A third source of PIM, indicated by reference numeral 34, occurs beyond the external antenna 14 and outside of the antenna feed system and, as such, may be referred to as Air PIM. The third source of PIM may occur in the air interface between an antenna of the additional radio system 29 and the external antenna 14 with which it communicates via the air interface. The additional radio system 29 is not necessarily one connected to the external diplexer or combiner 16. Similarly, the third PIM source 34 may be conducted to the receiver 22.

Example embodiments relate to radio systems which can take into account PIM sources external to the radio system, e.g. associated the second and third PIM sources 32, 34 as indicated in FIG. 1.

Figure 2:
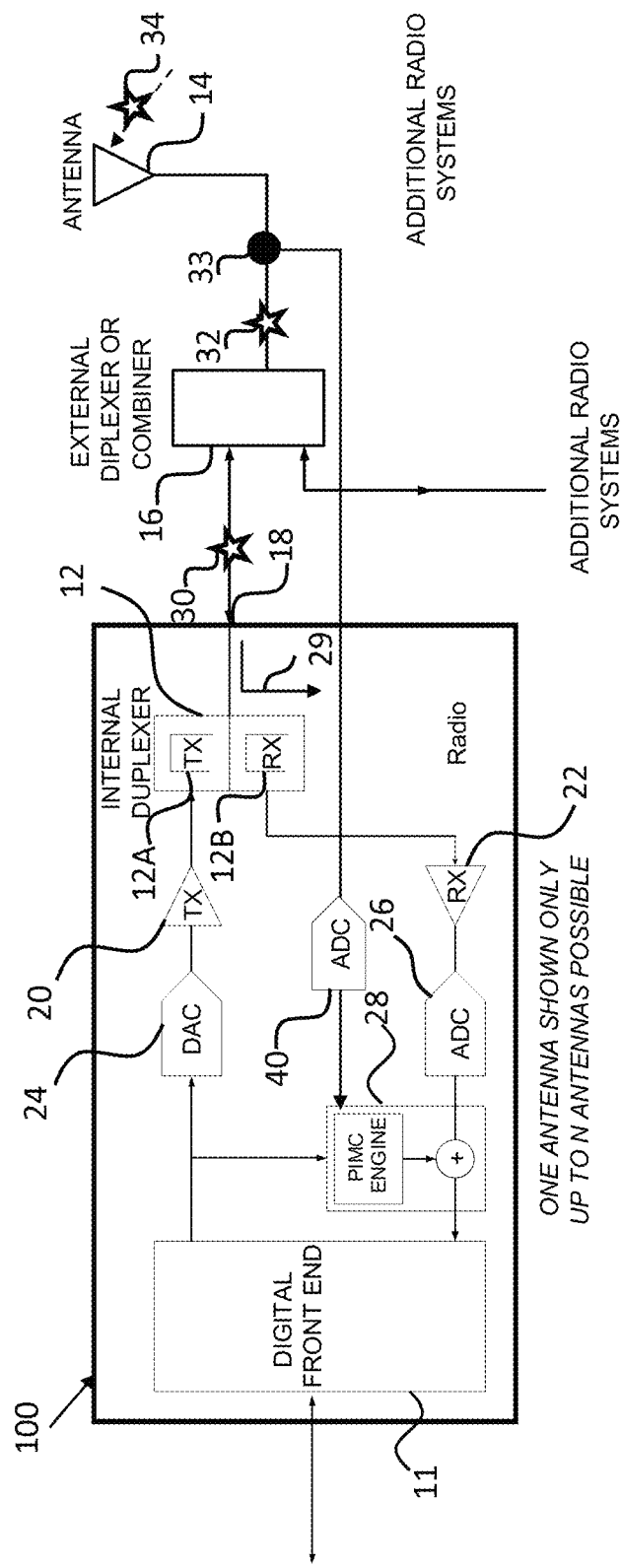
FIG. 2 is a schematic diagram of an example radio system providing PIM cancellation according to some example embodiments.

FIG. 2 is a schematic diagram of an example radio system 100 providing PIM cancellation according to some example embodiments. The radio system 100 is similar to that shown in FIG. 1, and hence like reference numerals indicate like components. Additionally, a signal path is set-up or configured between the PIMC engine 28 and a sampling or measurement node 33 located between the external diplexer or combiner 16 and the external antenna 14. A further analogue to digital converter (ADC) 40 in said signal path provides a digital representation of said sampled or measured signal to the PIMC engine 28. The sampling or measurement node 33 may be provided by any suitable RF coupling means. In this way, PIM due to second and/or third PIM sources 32, 34 may be provided via the further ADC 40 to the PIMC engine 28. This is in addition to signals representing the internal first PIM source 30 via example coupling 29.

In overview, the FIG. 2 configuration allows the PIMC engine 28 to receive conducted transmitted signals from internal and external sources (to the radio system 100), including Air PIM. An either/or approach may be taken whereby the PIMC engine 28 may be configured selectively to choose either or both of the internal and external sources for generation of a PIM signal for cancellation.

Figure 3:
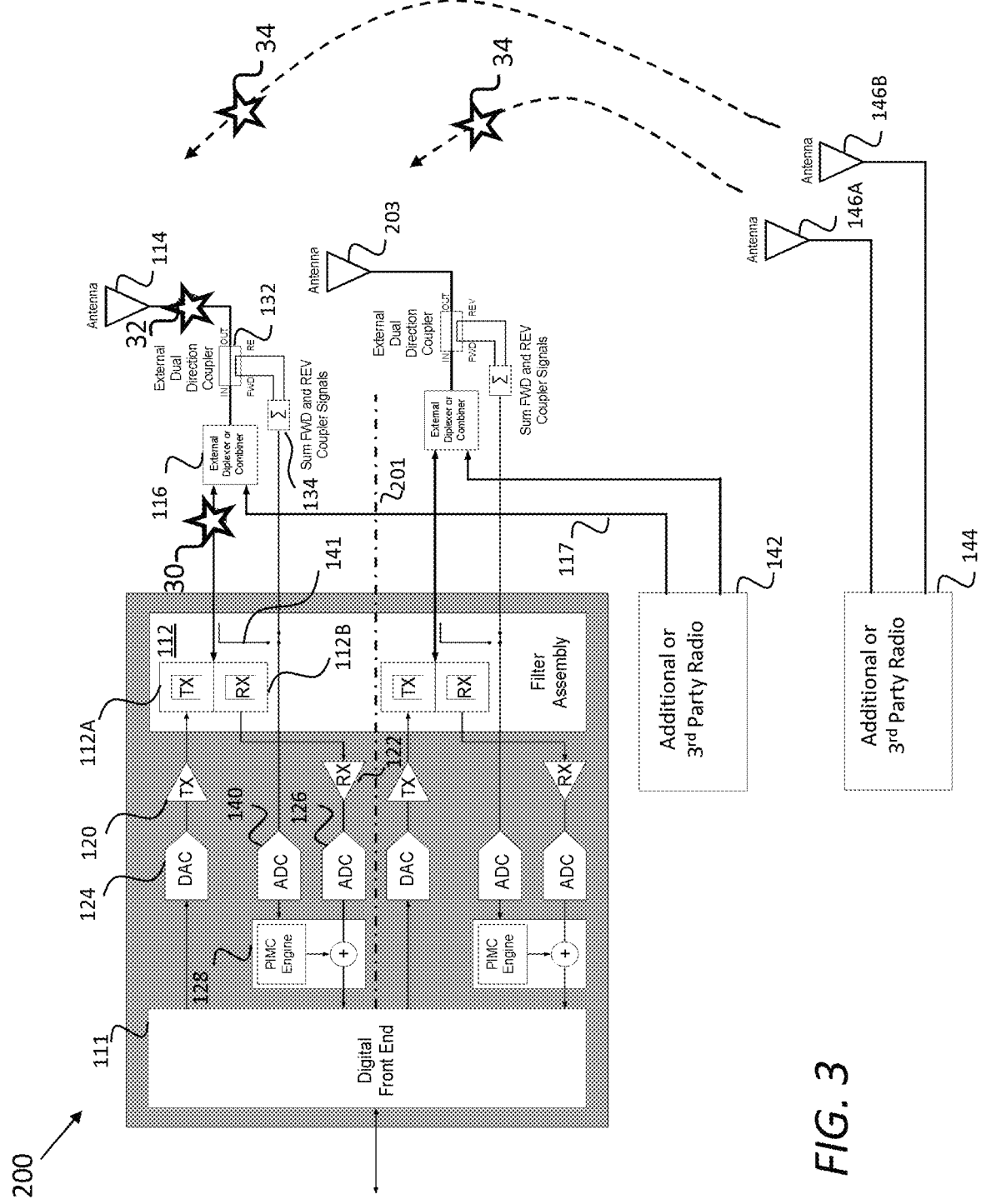
FIG. 3 is a schematic diagram of another example radio system providing PIM cancellation according to some example embodiments.

FIG. 3 is a schematic diagram of another example radio system 200 according to some example embodiments, similar to the FIG. 2 example. The radio system 200 comprises two radios within a common infrastructure.

The radio system 200 comprises a digital front end 111 for handling, in the digital domain, digital signal processing appropriate for, inter alia, transmitting and receiving RF signals. The radio system 200 also comprises an internal duplexer 112 connected to an external antenna 114, in this case via an external diplexer or combiner 116 which enables one or more additional radio systems 142 to transmit and/or receive signals using the external antenna 114, e.g. via line 117. The external diplexer or combiner 116 is external in that it is connected beyond, i.e. downstream of, an antenna port of the radio system 200, and can therefore be added or accessed without the need to physically access the radio system. The one or more additional radio systems 142 may, in this example, be any type of radio system that may wish to utilise the external antenna 114 and may or may not comprise one or more radio systems provided on the same physical infrastructure of the shown radio system 200. The internal duplexer 112 may comprise first and second duplexer filters 112A, 112B, a first being a transmitter (Tx) duplexer filter having a passband providing a signal path between a transmitter (Tx) 120 and the external antenna 114, and the second being a receiver (Rx) duplexer filter providing a signal path between the antenna and a receiver (Rx) 122. No path between the transmitter 120 and the receiver 122 should exist. The signal path between the digital front end 111 and the transmitter 120 may comprise a digital to analogue converter (DAC) 124 and the signal path between the receiver 122 and the digital front end may comprise an analogue to digital converter (ADC) 126.

A PIM cancellation (PIMC) engine 128 may be provided as described above.

The above-mentioned components of radio system 200 provide a first radio. The shown radio system 200 comprises further components, effectively the same or similar to those described above, providing a second radio with a common digital front end 111. These further components are indicated below the chain line 201 and perform the same functions in relation to a different external antenna 203. This represents a real-world scenario and, in fact, a radio infrastructure of this sort may comprise greater than two radios.

As in the FIG. 2 example, a signal path is provided between the PIMC engine 128 and a sampling or measurement node 132 located between the external diplexer or combiner 116 and the external antenna 114. A further analogue to digital converter (ADC) 140 in said signal path provides a digital representation of said sampled or measured signal to the PIMC engine 128. The sampling or measurement node 132 may be provided by any suitable RF coupling means. In the shown example, the sampling or measurement node 132 is a dual direction coupler (a four port device), the FWD and REV outputs of which are connected to a summer 134 having an output connected to said ADC 140.

The same configuration may be used for the second radio, below the chain line 201.

In this way, PIM due to second and/or third PIM sources 32, 34 may be provided via the further ADC 140 to the PIMC engine 128, as well as signals representing the internal first PIM source 130 via a coupling 141.

In this specific implementation, the use of a dual direction coupler 132 followed by the summer 134 enables PIM sources on either side of the coupling point to be detected.

One or more additional radios 144 utilizing one or more external antennas 146A, 146B are shown as example sources of Air PIM to both the first and second radios of the radio system 200.

In overview, the FIG. 3 configuration allows the PIMC engine 128 to receive conducted transmitted signals from internal and external sources (to the radio system 200), including Air PIM. An either/or approach may be taken whereby the PIMC engine 128 may be configured selectively to choose either or both of the internal and external sources.

Figure 4:
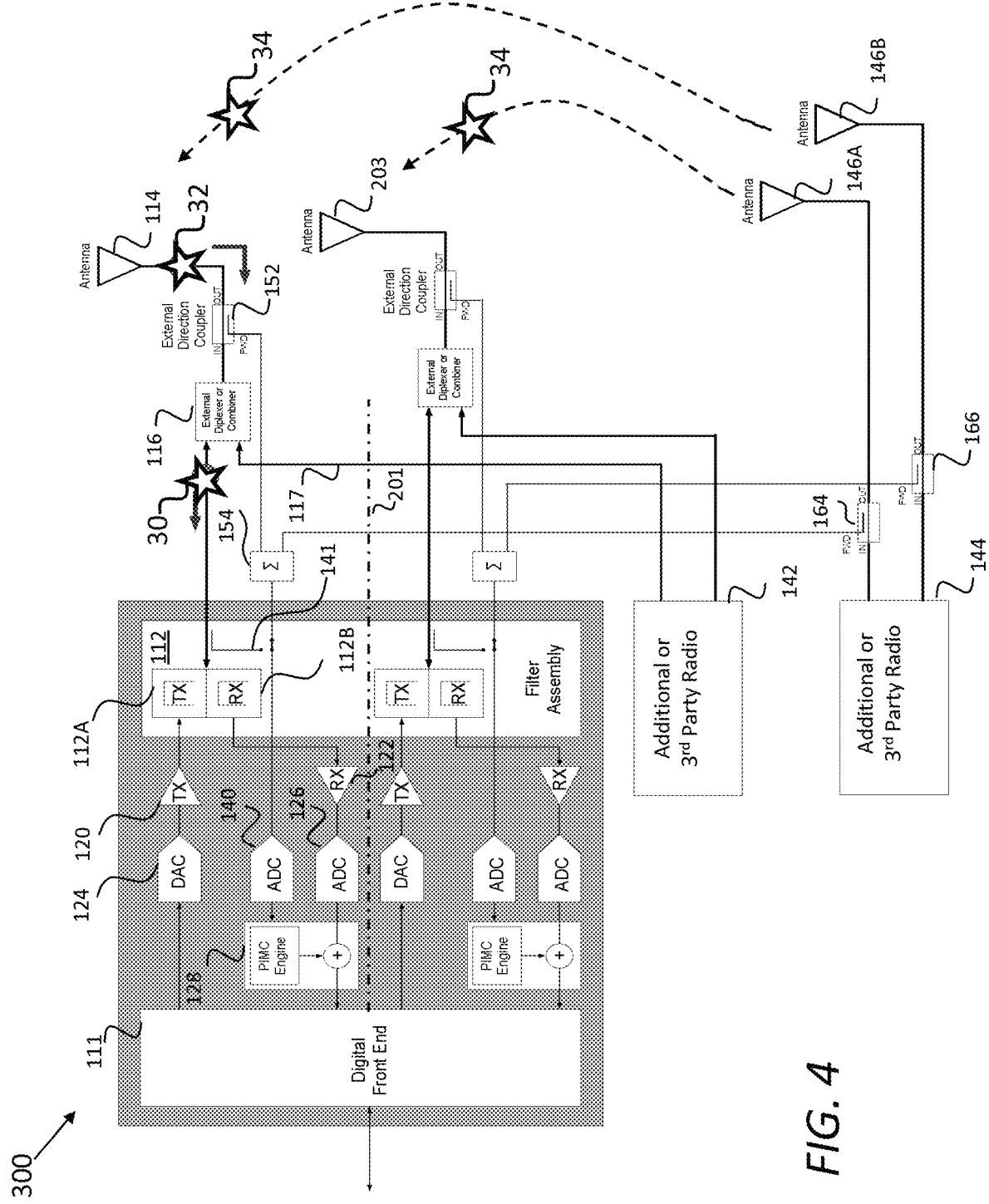
FIG. 4 is a schematic diagram of another example radio system providing PIM cancellation according to some example embodiments.

FIG. 4 is a schematic diagram of another example radio system 300 according to some example embodiments, similar to the FIGS. 2 and 3 examples.

As before, the radio system 300 comprises a digital front end 111 for handling, in the digital domain, digital signal processing appropriate for, inter alia, transmitting and receiving RF signals. The radio system 300 also comprises an internal duplexer 112 connected to an external antenna 114, in this case via an external diplexer or combiner 116 which enables one or more additional radio systems 142 to transmit and/or receive signals using the external antenna 114, e.g. via line 117. The external diplexer or combiner 116 is external in that it is connected beyond, i.e. downstream of, an antenna port of the radio system 300, and can therefore be added or accessed without the need to physically access the radio system. The one or more additional radio systems 142 may, in this example, be any type of radio system that may wish to utilise the external antenna 114 and may or may not comprise one or more radio systems provided on the same physical infrastructure of the shown radio system 300. The internal duplexer 112 may comprise first and second duplexer filters 112A, 112B, a first being a transmitter (Tx) duplexer filter having a passband providing a signal path between a transmitter (Tx) 120 and the external antenna 114, and the second being a receiver (Rx) duplexer filter providing a signal path between the antenna and a receiver (Rx) 122. No path between the transmitter 120 and the receiver 122 should exist. The signal path between the digital front end 111 and the transmitter 120 may comprise a digital to analogue converter (DAC) 124 and the signal path between the receiver 122 and the digital front end may comprise an analogue to digital converter (ADC) 126.

A PIM cancellation (PIMC) engine 128 may be provided as described above.

The above-mentioned components of radio system 300 provide a first radio. The radio system 300 may comprise further same or similar components providing a second radio with a common digital front end 111. These further components are indicated below the chain line 201 and perform the same functions in relation to a different external antenna 203. This represents a real-world scenario and, in fact, a radio infrastructure of this sort may comprise greater than two radios.

As in the FIG. 3 example, a signal path is provided between the PIMC engine 128 and a sampling or measurement node 152 located between the external diplexer or combiner 116 and the external antenna 114. A further analogue to digital converter (ADC) 140 in said signal path provides a digital representation of said sampled or measured signal to the PIMC engine 128. The sampling or measurement node 152 may be provided by any suitable RF coupling means. In the shown example, the sampling or measurement node 152 is a direction coupler (a three port device) the FWD output of which is connected to a summer 154 having an output connected to said ADC 140. Another input of the summer 154 is coupled by one or more couplers 164, 166 to respective outputs of another radio system 144 connected to antennas 146A, 146B.

In this way, PIM due to second and/or third PIM sources 32, 34 may be provided via the further ADC 140 to the PIMC engine 128, as well as signals representing the internal first PIM source 130 via a coupling 141. By summing and routing additional signal sources to the PIMC engine 128, the PIMC engine has multiple options for sampling or measuring internal and external signal sources.

Figure 5:
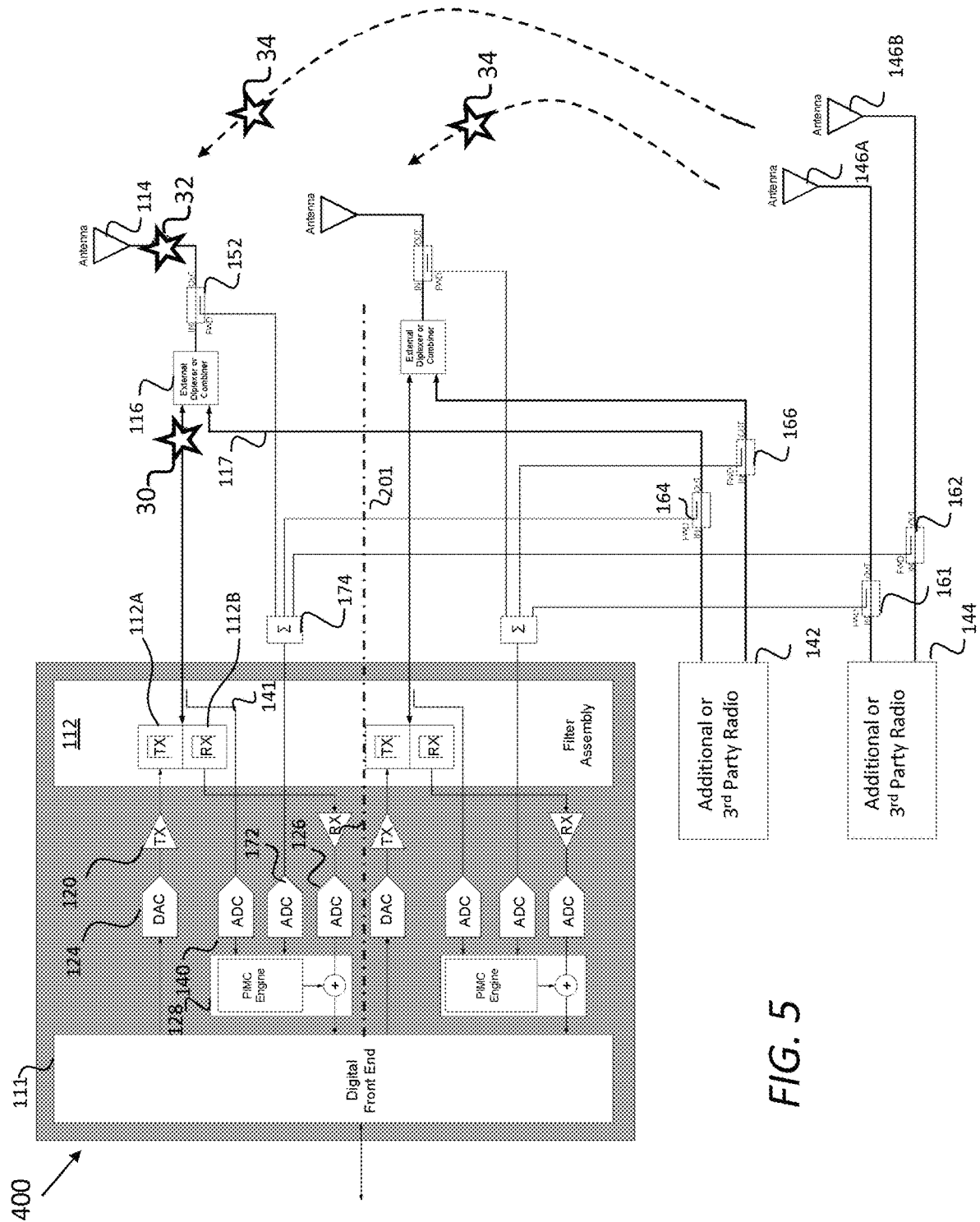
FIG. 5 is a schematic diagram of another example radio system providing PIM cancellation according to some example embodiments.

FIG. 5 is a schematic diagram of another example radio system 400 according to some example embodiments, similar to the FIGS. 2, 3 and 4 examples.

As before, the radio system 400 comprises a digital front end 111 for handling, in the digital domain, digital signal processing appropriate for, inter alia, transmitting and receiving RF signals. The radio system 400 also comprises an internal duplexer 112 connected to an external antenna 114, in this case via an external diplexer or combiner 116 which enables one or more additional radio systems 142 to transmit and/or receive signals using the external antenna 114, e.g. via line 117. The external diplexer or combiner 116 is external in that it is connected beyond, i.e. downstream of, an antenna port of the radio system 400, and can therefore be added or accessed without the need to physically access the radio system. The one or more additional radio systems 142 may, in this example, be any type of radio system that may wish to utilise the external antenna 114 and may or may not comprise one or more radio systems provided on the same physical infrastructure of the shown radio system 400. The internal duplexer 112 may comprise first and second duplexer filters 112A, 112B, a first being a transmitter (Tx) duplexer filter having a passband providing a signal path between a transmitter (Tx) 120 and the external antenna 114, and the second being a receiver (Rx) duplexer filter providing a signal path between the antenna and a receiver (Rx) 122. No path between the transmitter 120 and the receiver 122 should exist. The signal path between the digital front end 111 and the transmitter 120 may comprise a digital to analogue converter (DAC) 124 and the signal path between the receiver 122 and the digital front end may comprise an analogue to digital converter (ADC) 126.

A PIM cancellation (PIMC) engine 128 may be provided as described above.

The above-mentioned components of radio system 400 provide a first radio. The radio system 400 may comprise further same or similar components providing a second radio with a common digital front end 111. These further components are indicated below the chain line 201 and perform the same functions in relation to a different external antenna 203. This represents a real-world scenario and, in fact, a radio infrastructure of this sort may comprise greater than two radios.

As in the FIGS. 2, 3 and 4 examples, a signal path is provided between the PIMC engine 128 and a sampling or measurement node 152 located between the external diplexer or combiner 116 and the external antenna 114. A further analogue to digital converter (ADC) 140 in said signal path provides a digital representation of said sampled or measured signal to the PIMC engine 128. The sampling or measurement node 152 may be provided by any suitable RF coupling means. In the shown example, the sampling or measurement node 152 is a direction coupler (a three port device) the FWD output of which is connected to an input of a summer 174 having an output connected to a dedicated ADC 172 rather than the existing ADC 140. This provides a more flexible design and is appropriate to real-world radio architectures, as disclosed below with reference to FIG. 6, whereby it is appropriate to use dedicated channels for the internal and external PIM sources. Another input of the summer 174 may be coupled to respective outputs of another radio system 144 connected to antennas 146A, 146B, the coupling being via couplers 161, 162. Optionally, for the additional radio system 142, respective outputs of said additional radio system may provide another input to the summer 174. The outputs of the additional radio system 142 may be coupled to the summer 174 via couplers 164, 166.

In this way, PIM due to second and/or third PIM sources 32, 34 may be provided via the dedicated ADC 172 to the PIMC engine 128, whereas signals representing the internal first PIM source 130 are provided to the PIMC engine via the ADC 140. Thus, the PIMC engine 128 has multiple options for sampling or measuring internal and external signal sources and can switch between one or both sources via dedicated channels and corresponding ADCs 140, 172.

Figure 6:
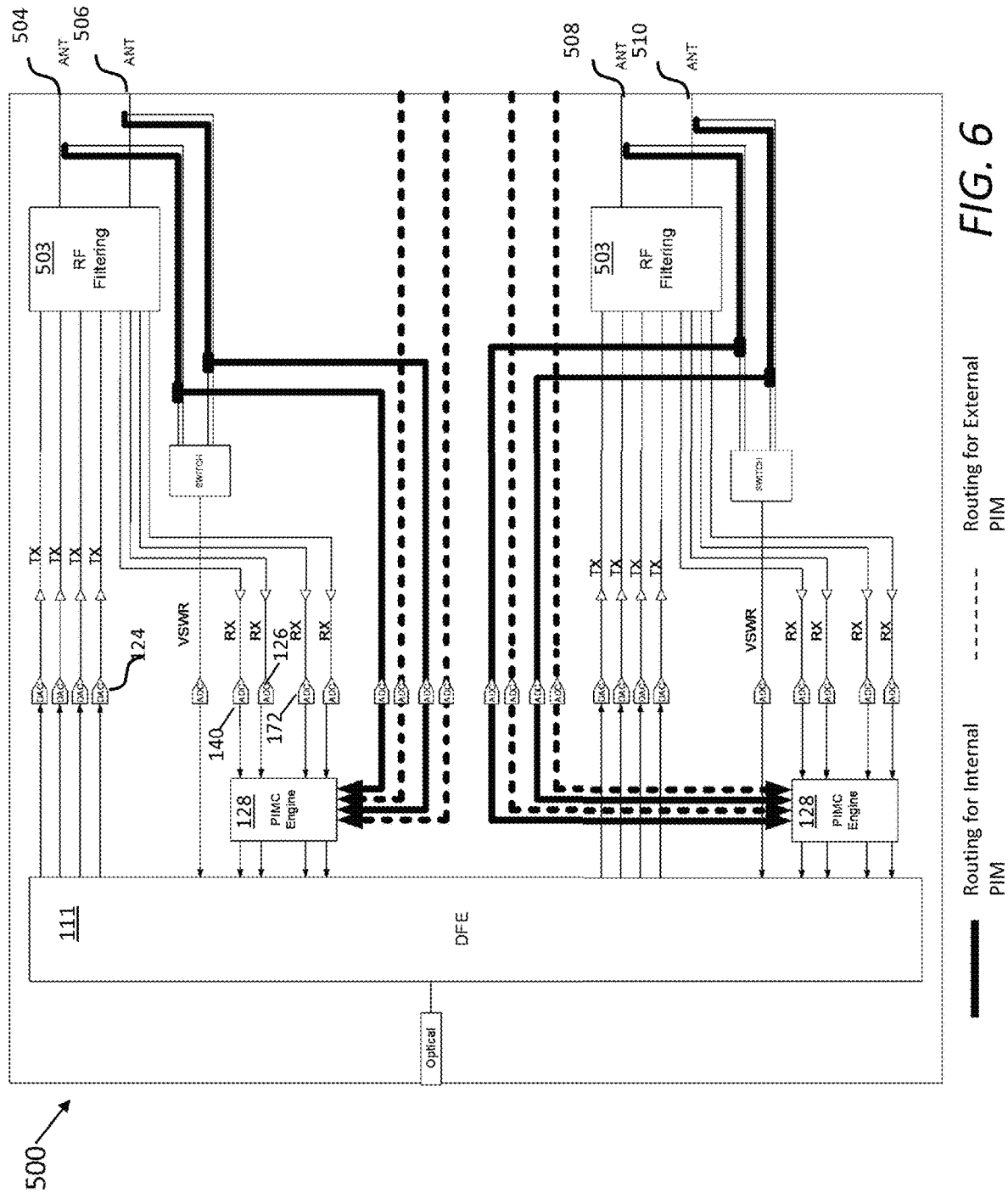
FIG. 6 is a schematic diagram of certain elements a radio architecture, configured according to some example embodiments.

FIG. 6 is a schematic block diagram of some elements a radio architecture 500, which in this case is a four transmitter, four receiver (4T4R) remote radio head (RRH) architecture. The RRH architecture is shown to indicate certain advantages of the FIG. 5 embodiment, in particular whereby an existing hardware architecture, such as that shown schematically in FIG. 6, may be adapted to utilize respective channels for the internal and external PIM sources. Following the reference numerals in FIG. 5, the radio architecture 500 comprises a digital front end 111, one or more PIMC engines 128 and the various analogue to digital converters (ADCs) 140, 172, 126 and the digital to analogue converter (DAC) 124 shown and described with reference to FIG. 5. The radio architecture comprises four antenna ports 504, 506, 508, 510, and filters 503. Certain elements and interconnections are not shown.

As indicated in the key, the radio architecture 500 is configured for signal routing between the internal (forward) direction coupling for the internal PIM and the PIMC engine 128, as indicated by the solid lines. The radio architecture 500 is configured for signal routing between external sampling or measurement nodes and the PIMC engine 128 for the external PIM sources, as indicated by the broken lines.

The radio architecture 500 is provisioned to support internal transmit measurement or sampling for PIMC for up to eight antennas. As a result, if the radio architecture 500 in practice only supports four antennas (which is a more typical configuration) then there are four paths to the PIMC engine 128 left unused. These four unused paths can be used to support the external transmit sampling connections 152 shown in FIG. 5.

If the radio architecture 500 is required to support eight antennas, then a choice between internal transmit sampling and external transmit sampling will need to be made when implementing the duplexer filter assembly 112. This can be done on a case-by-case basis (e.g. variant-by-variant or customer-by-customer) without impacting the transmitter and/or any PSU assembly.

In some example embodiments, the internal signal routing (solid lines) may be shared with forward power detect for Voltage Standing Wave Ratio (VSWR) measurement on antennas 1-4. Also, in some embodiments, the signal routing for external signals (broken lines) may be shared with forward power detect for Voltage Standing Wave Ratio (VSWR) measurement on antennas 5-8, if eight antennas are configured.

Example embodiments disclosed herein provide visibility to transmitted signals both internal and external to the radio system, thereby providing a more complete and accurate representation of PIM sources that affect the received signal, which may be used by the PIMC engine for performing PIMC. Example embodiments also enable accounting for transmitter path variations versus frequency, both internally and externally.

Figure 7:
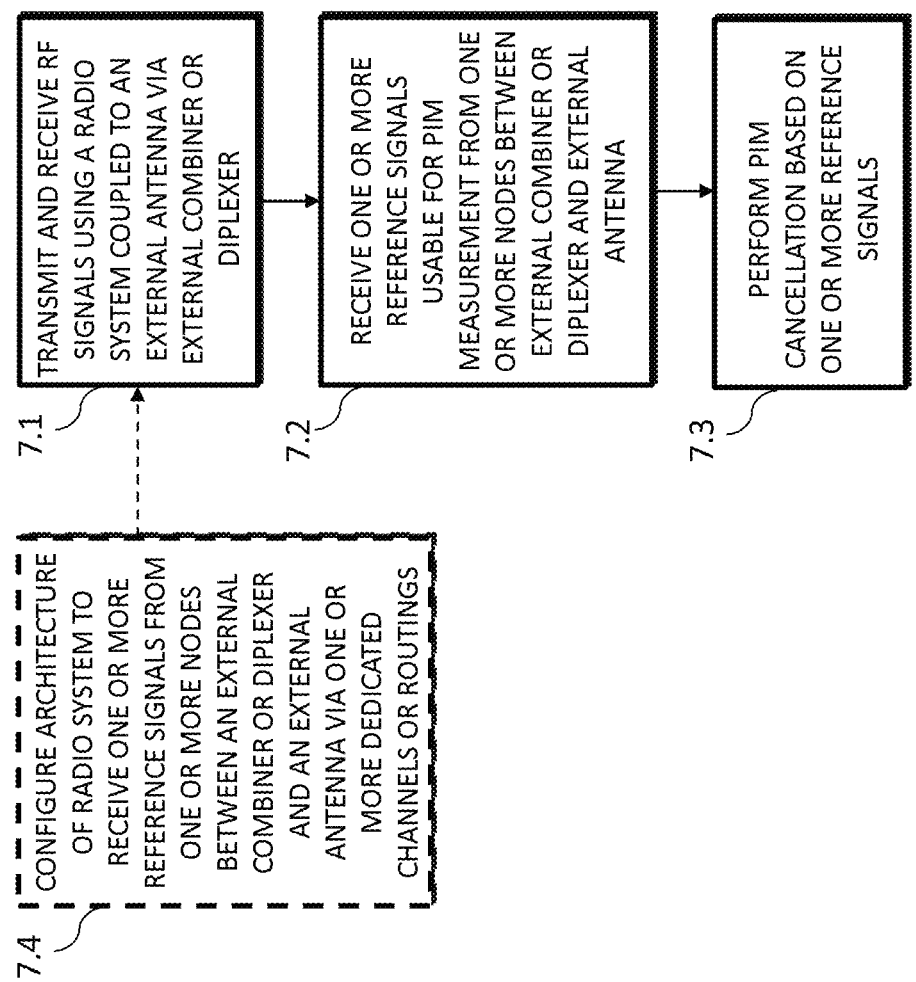
FIG. 7 is a flow diagram showing operations according to some example embodiments.

FIG. 7 is a flow diagram indicating processing operations that may be performed at the PIMC engine 128.

A first operation 7.1 may comprise transmitting and receiving radio frequency signals using a radio system coupled to an external antenna via an external combiner or diplexer.

A second operation 7.2 may comprise receiving one or more reference signals usable for measurement of passive intermodulation from one or more nodes provided in a signal path external to the radio system, a first one of said nodes being associated with a signal path between the external combiner or diplexer and the external antenna.

A third operation 7.3 may comprise performing passive intermodulation cancellation based on the received one or more reference signals, including a first reference signal from the first node.

A fourth, optional, operation 7.4, which may occur prior to the first operation 7.1, may comprise configuring a radio architecture to receive one or more reference signals from one or more nodes between the external combiner or diplexer and the external antenna via one or more dedicated channels or routings.

Another, optional operation (not shown) may comprise also receiving one or more reference signals usable for measurement of passive intermodulation from one or more nodes provided in a signal path internal to the radio system.

Example embodiments are configured to enable routing not only of external signal sources of PIM to the PIMC engine, but also of internal sources of PIM as an alternative or additional source. This inter-selection may be achieved through use of one or more switches. In some embodiments, both internal and external sources of PIM may be summed/combined in any suitable manner to represent a combined PIM signal for routing to the PIMC engine for PIM cancellation.

Figure 8:
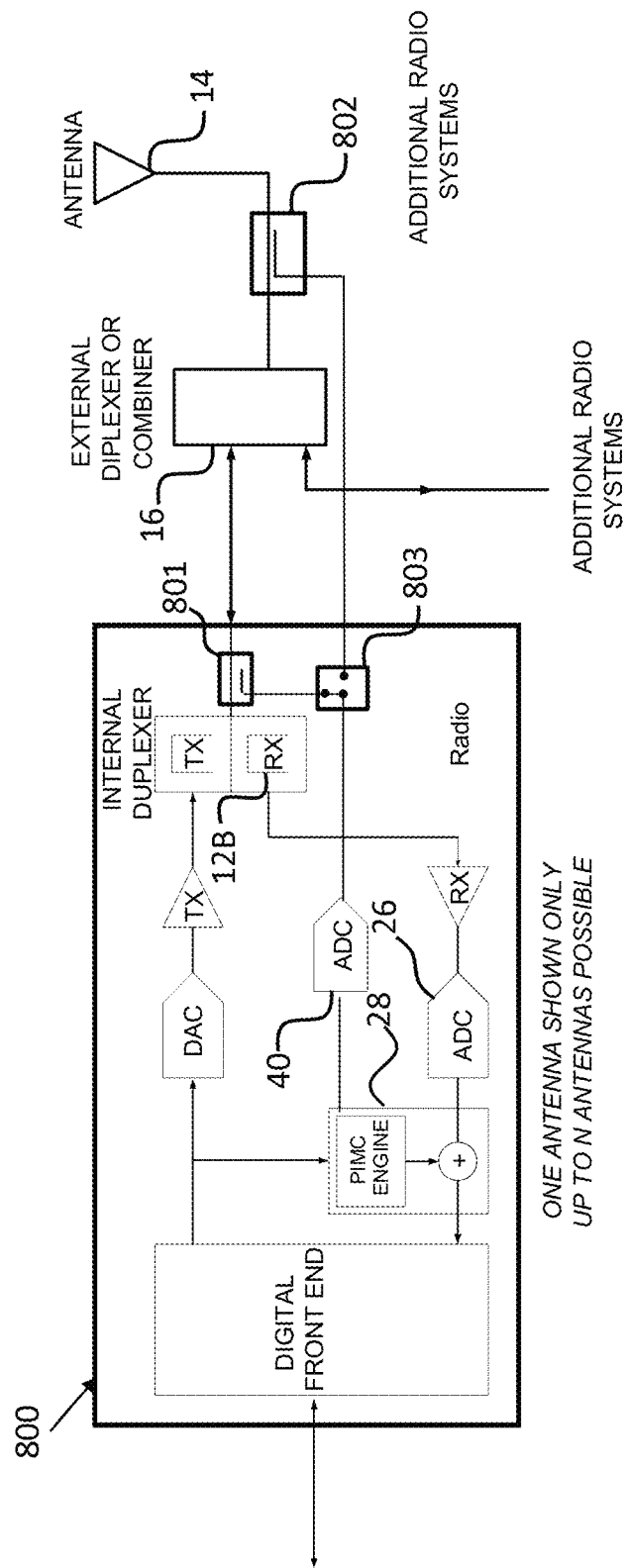
FIG. 8 is a schematic diagram of another example radio system providing PIM cancellation, including functionality for switching between internal and external PIM sources, according to some example embodiments.

FIG. 8 is a schematic diagram of an example radio system 800 providing PIM cancellation according to some example embodiments. The radio system 800 is similar to that shown in FIG. 2, save for the addition of first and second coupling elements 801, 802 for respectfully coupling internal and external sources of PIM to an additional switching module 803 (which can be of any suitable type). The switching module 803 may be configured to selectively switch either source of PIM to the ADC 40 and therefore the PIMC engine 28. Similar switching configurations may be applied also to the FIG. 3-5 embodiments.

Example embodiments may also comprise at least one radio (for example one or more of the additional or third party radios) directly coupled or connected, e.g. via a tap connection, to an antenna, not via an additional combiner or diplexer. The source of PIM in this case is sampled at the output of the additional or third party radio. This is shown in the lower portion of FIG. 5, i.e. between the additional or third party radio 144 and antennas 146A, 146B, but is a possible modification to any of the FIGS. 2-4 embodiments also.

Figure 9:
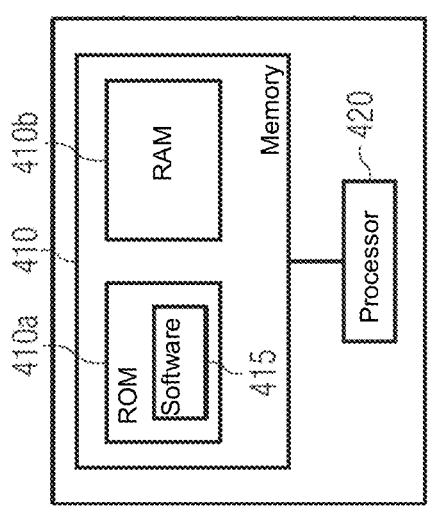
FIG. 9 is a block diagram of hardware components of an apparatus according to some example embodiments.

FIG. 9 shows an apparatus according to an embodiment. The apparatus may be configured to perform the operations described herein, for example operations described with reference to FIG. 7. The apparatus comprises at least one processor 420 and at least one memory 410 directly or closely connected to the processor. The memory 410 includes at least one random access memory (RAM) 410b and at least one read-only memory (ROM) 410*a*. Computer program code (software) 415 is stored in the ROM 410*a*. The at least one processor 420, with the at least one memory 410 and the computer program code 415 are arranged to cause the apparatus to at least perform at least the method according to FIG. 7.

Figure 10:
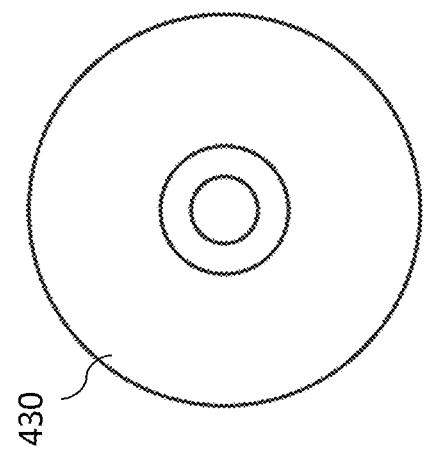
FIG. 10 is a plan view of a non-transitory medium for carrying computer-readable code, according to some example embodiments.

FIG. 10 shows a non-transitory media 43*o* according to some embodiments. The non-transitory media 430 is a computer readable storage medium. It may be e.g. a CD, a DVD, a USB stick, a blue ray disk, etc. The non-transitory media 430 stores computer program code causing an apparatus to perform the method of FIG. 7, when executed by a processor such as processor 420 of FIG. 9.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi. Accordingly, a base station may be a BTS, a NodeB, an eNodeB, a gNodeB, a WiFi access point etc.

A memory may be volatile or non-volatile. It may be e.g. a RAM, an SRAM, a flash memory, a FPGA block ram, a DCD, a CD, a USB stick, and a blue ray disk. If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:
at least one processor; and
at least one memory storing instructions that, when executed by the at least one processor, cause the apparatus to:
transmit and receive radio frequency signals using a radio system coupled to an external antenna via an additional combiner or diplexer;
receive, on one or more dedicated signal paths or channels, one or more reference signals usable for measurement of passive intermodulation from one or more nodes provided in a signal path external to the radio system, a first node of the one or more nodes being associated with a signal path between the additional combiner or diplexer and the external antenna, wherein the first node is a dual direction coupler having forward and reverse ports that are coupled to a summing node, wherein a first reference signal of the one or more reference signals is received from an output of the summing node; and
perform passive intermodulation cancellation on the received radio frequency signals based on the received one or more reference signals including the first reference signal.

2. The apparatus of claim 1, wherein the additional combiner or diplexer is coupled to one or more further radio systems for coupling the one or more further radio systems to the external antenna.

3. The apparatus of claim 1, wherein the received one or more reference signals are received via a second summing node which sums the first reference signal with one or more other reference signals from one or more further radio systems.

4. The apparatus of claim 1, wherein one or more other reference signals include at least one reference signal received direct from an output of one or more further radio systems.

5. The apparatus of claim 1, wherein the instructions, when executed by the at least one processor, cause the apparatus to:
receive a second reference signal from a second node associated with a signal path between the radio system and the additional combiner or diplexer, and wherein performance of passive intermodulation cancellation is based on the first reference signal and the second reference signal.

6. The apparatus of claim 5, wherein the instructions, when executed by the at least one processor, cause the apparatus to:
control selective receipt of one or both of the first reference signal and the second reference signal for use in passive intermodulation cancellation.

7. The apparatus of claim 5, wherein the second node is associated with a signal path between an internal transmit/receive duplexer of the radio system and the additional combiner or diplexer.

8. The apparatus of claim 5, further comprising:
a passive intermodulation cancellation engine configured to perform passive intermodulation cancellation based on the received one or more reference signals; and
dedicated first and second signal paths or channels between respective first and second ports of the radio system and the passive intermodulation cancellation engine for receiving the first and second reference signals.

9. The apparatus of claim 8, wherein the radio system comprises N ports for coupling to N external antennas and N corresponding channels between the ports and the passive intermodulation cancellation engine, and wherein the dedicated first and second signal paths or channels are configured to employ a subset of the N channels not coupled via their corresponding port to an external antenna.

10. The apparatus of claim 1, comprising a plurality of radio systems.

11. The apparatus of claim 1, comprising a remote radio head (RRH).

12. A method, comprising:
transmitting and receiving radio frequency signals using a radio system coupled to an external antenna via an additional combiner or diplexer;
receiving, on one or more dedicated signal paths or channels, one or more reference signals usable for measurement of passive intermodulation from one or more nodes provided in a signal path external to the radio system, a first node of the one or more nodes being associated with a signal path between the additional combiner or diplexer and the external antenna, wherein the first node is a dual direction coupler having forward and reverse ports that are coupled to a summing node, wherein a first reference signal of the one or more reference signals is received from an output of the summing node; and performing passive intermodulation cancellation on the received radio frequency signals based on the received one or more reference signals including the first reference signal.

13. The method of claim 12, wherein the additional combiner or diplexer is coupled to one or more further radio systems for coupling the one or more further radio systems to the external antenna.

14. The method of claim 12, wherein the received one or more reference signals are received via a second summing node which sums the first reference signal with one or more other reference signals from one or more further radio systems.

15. The method of claim 12, wherein one or more other reference signals include at least one reference signal received direct from an output of one or more further radio systems.

16. An apparatus, comprising:
at least one processor; and
at least one memory storing instructions that, when executed by the at least one processor, cause the apparatus to:
   transmit and receive radio frequency signals using a radio system coupled to an external antenna via an additional combiner or diplexer;
   receive one or more reference signals usable for measurement of passive intermodulation from one or more nodes provided in a signal path external to the radio system, a first node of the one or more nodes being associated with a signal path between the additional combiner or diplexer and the external antenna, a second node of the one or more nodes being associated with a signal path between an internal transmit/receive duplexer of the radio system and the additional combiner or diplexer, wherein a first reference signal of the one or more reference signals is received via the first node and a second reference signal of the one or more reference signals is received via the second node; and
   perform passive intermodulation cancellation based on one or both of the first reference signal and the second reference signal.

\* \* \* \* \*